US008186720B2

(12) United States Patent
Davis

(10) Patent No.: US 8,186,720 B2
(45) Date of Patent: May 29, 2012

(54) CONNECTION MODULE AND CONNECTOR

(75) Inventor: Mathew William Davis, Barnstaple (GB)

(73) Assignee: Parker Hannifin Ltd, Barnstable, Devon (GB)

( * ) Notice: Subject to any disclaimer, the term of this patent is extended or adjusted under 35 U.S.C. 154(b) by 0 days.

(21) Appl. No.: 12/724,501

(22) Filed: Mar. 16, 2010

(65) Prior Publication Data

US 2010/0171304 A1 Jul. 8, 2010

Related U.S. Application Data

(60) Division of application No. 11/775,290, filed on Jul. 10, 2007, now abandoned, which is a continuation of application No. PCT/GB2005/000035, filed on Jan. 5, 2006.

(30) Foreign Application Priority Data

Jan. 11, 2005 (GB) .................... 0500491.6
May 5, 2005 (GB) .................... 0509199.6
Sep. 2, 2005 (GB) .................... 0517924.7
Dec. 23, 2005 (GB) .................... 0526431.2

(51) Int. Cl.
*F16L 27/04* (2006.01)

(52) U.S. Cl. .................... 285/261; 285/146.1; 285/147.1
(58) Field of Classification Search .................... 285/24, 285/27, 146.1–146.3, 147.1, 148.4, 261
See application file for complete search history.

(56) References Cited

U.S. PATENT DOCUMENTS

| 954,496 A | * | 4/1910 | Barron ........................ 285/148.4 |
| 1,015,435 A | * | 1/1912 | Greenlaw et al. ............. 285/267 |
| 4,856,822 A | * | 8/1989 | Parker ............................. 285/62 |
| 5,288,110 A | | 2/1994 | Allread | |
| 5,772,254 A | | 6/1998 | Felber et al. | |
| 6,871,881 B1 | * | 3/2005 | Hutton ........................... 285/219 |
| 2005/0151372 A1 | * | 7/2005 | Hutton ........................... 285/219 |

FOREIGN PATENT DOCUMENTS

| DE | 20 2004 004 878 U1 | 7/2004 |
| GB | 449 565 | 6/1936 |
| GB | 1 202 527 | 8/1970 |
| WO | 9722855 | 6/1997 |
| WO | 9846925 | 10/1998 |
| WO | 0052375 | 9/2000 |
| WO | 02088583 A1 | 11/2002 |

OTHER PUBLICATIONS

Notification of Transmittal of The International Search Report and The Written Opinion of the International Searching Authority, or the Declaration in corresponding International Application No. PCT/GB2006/000035, Jul. 6, 2006.

* cited by examiner

*Primary Examiner* — Aaron Dunwoody
*Assistant Examiner* — Fannie Kee
(74) *Attorney, Agent, or Firm* — John A. Molnar, Jr.

(57) ABSTRACT

System for connecting a secondary module to a structure having a port. The system includes a tapping connector attachable to the port, and a primary module attachable to the tapping connector, with the secondary module being mountable on the primary module. A collar is receivable over the tapping connector for supporting the primary module on the structure. The collar is attachable to the tapping connector with the primary module being attachable to the collar. A positioner is supported within the collar for fastening the collar to the tapping connector.

5 Claims, 14 Drawing Sheets

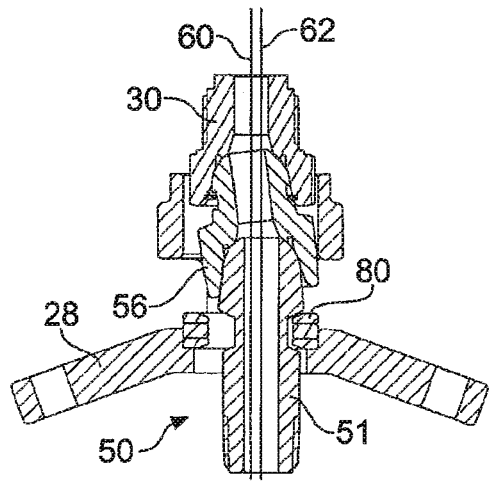
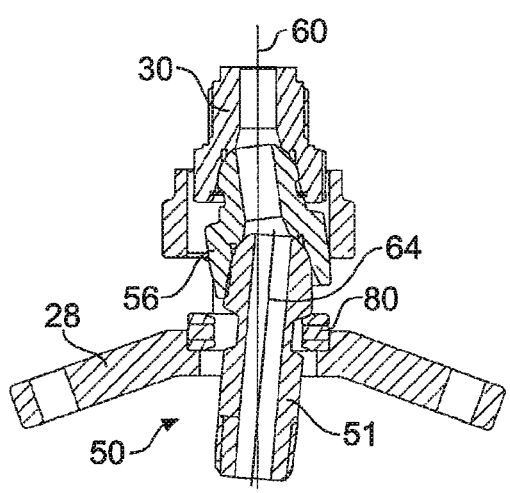
Fig. 6
Fig. 7
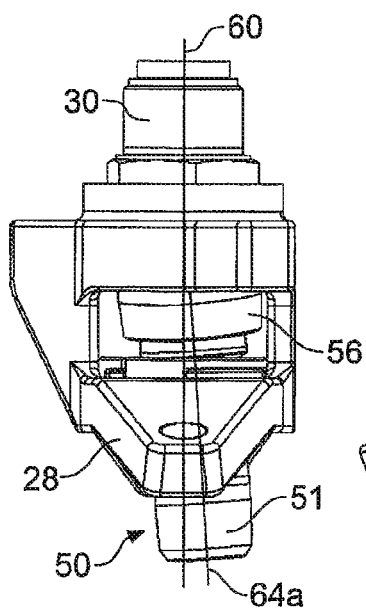
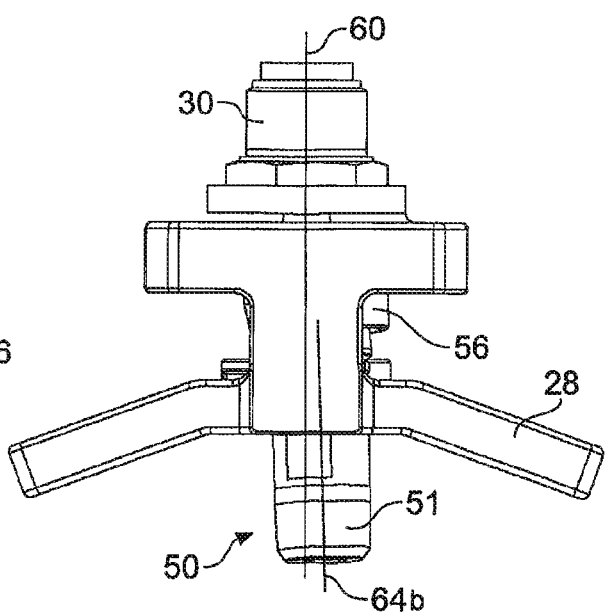
Fig. 8A
Fig. 8B

CONNECTION MODULE AND CONNECTOR

CROSS REFERENCE TO RELATED APPLICATIONS

This application is divisional of U.S. patent application Ser. No. 11/775,290, filed Jul. 10, 2007, now abandoned which is a continuation of International Application No. PCT/GB05/000035, filed Jan. 5, 2006, which designated the United States and claims priority to: Great Britain Patent Application No. 0500491.6; filed Jan. 11, 2005; Great Britain Patent Application No. 0509199.6; filed May 5, 2005; Great Britain Patent Application No. 0517924.7, filed Sep. 2, 2005; and Great Britain Patent Application No. 0526431.2, filed Dec. 23, 2005.

BACKGROUND OF THE INVENTION

This invention relates to a connection module and a connector. In particular, the invention relates to a connector and to a connection module for use in connecting instrumentation equipment to a fluid container such as a process line or pressure vessel.

Within the instrumentation industry, it is necessary to take fluid from a fluid container such as a process pipeline or pressure vessel, so as to take measurements of quantities such as pressure, temperature, flow and fluid level measurements.

The instruments which are used to take such measurements are typically connected to a fluid container by a system of pipes, manifolds and valves. The connection system can include one or more tapping connections for tapping the fluid container.

The instruments which are used to take such measurements require maintenance, such as calibration. In order to carry this out it is necessary to modify the flow of the fluid between the fluid container and the instrument.

This flow modification is currently carried out by a number of methods all of which in some way require systems which are attached to the main process apparatus by means of threaded, flanged or welded connections. Traditionally the fluid passes through an isolation valve before being passed through tubing, pipe work or flanges to other valves commonly held within a manifold block. This manifold block may either be attached directly to the instrument or attached via a further system of tubing or pipe work. Known arrangements are complicated and require a large amount of time and effort to install and remove. This makes maintenance of instruments costly, since to remove and then reattach an instrument to a fluid container can actually take longer than the calibration process itself.

A number of other problems are associated with the traditional installation methods.

For example, traditional connection systems are bulky. These systems require a lot of space and are weighty. Indeed, such systems require additional support due to their weight.

Manifold systems traditionally have small orifice sizes typically less than 6 mm—this can cause a number of system problems such as becoming clogged by solid particles within a system.

The phenomena known as gauge line error (GLE) is known in the industry as a potential source of error. This is caused by a combination of the distance between the main process fluid and the instrument, the reduced bore sizes and the level of turbulence caused by the shear quantity of connections between the individual elements of the system. Turbulence associated with GLE can inhibit accurate measurement by an instrument connected to a fluid container. Reducing the path length for fluid flow between a fluid container and a instrument can reduce turbulence and therefore GLE. Known systems struggle to provide a short path length. Longer path lengths also make leaks more probable and more difficult to find.

Due to the distance between the fluid container and the instrument, and the need to keep an adequate level of viscosity within the fluid, it is sometimes necessary to heat the system including all manifolds and tubing or piping. This process can include a number of costly methods including cladding, electrical heating systems or steam-heated systems. These systems result in additional weight, space requirements and additional control systems resulting in higher costs.

An example of a fluid container is a pipeline. FIG. 1 shows an example of a pipeline 2, which includes an orifice plate assembly 10. The orifice plate assembly 10 includes two flanges 4 forming a flanged connection. The orifice plate assembly 10 also includes a plate 6 held between the two flanges 4. The plate includes an aperture which is smaller than an inner diameter of the pipeline 2, and is thus designed to reduce the flow of the fluid passing through the pipeline 2.

In such an arrangement, fluid can be passed to an instrument via tapping points. In the example shown in FIG. 1, suitable tapping points are indicated by the arrows 8. These tapping points 8 are located one on either side of the plate.

Pipelines of this kind are relatively crude in construction and thus tapping connection ports provided at the tapping points 8, although conforming with relevant international standards, can be misaligned with respect to one another. This misalignment can be present in all six degrees of freedom (three translational and three rotational directions). Thus, one of the tapping connectors may be misaligned with respect to another tapping connector in any of the x, y or z directions indicated in FIG. 1. The tapping connectors may also be misaligned in the sense that they are skewed (angled). Accordingly, one of the tapping connectors may be misaligned with respect to another tapping connector in any of the rotational directions ($\theta_x$, $\theta_y$, $\theta_y$) indicated in FIG. 1.

This misalignment has previously been addressed in traditional connection systems by simply adding additional bends to the tubing or pipe work to account for the misalignment.

Traditional connection systems include separate components that are typically obtained from different suppliers. The different components can perform different functions. For example, a connection component can connect directly to a fluid container. A manifold component including valves and so forth can be provided intermediate a connection component and an instrument component. The instrument component can provide a connection to a variety of instrument types, or can itself include an instrument.

The components of such a system need to be inter-connectable. For example, a manifold block may either be attached directly to an instrument or attached via a further system of tubing or pipe work to a fluid container. The connections must ensure leak free service. The connections must also be capable of accepting additional loads subjected by means of external forces. The joint should also be non-permanent to allow for maintenance.

Traditional connections between the various components of an instrumentation system employ threaded connections or flange arrangements.

Threaded connections suffer from problems with orientation. Also, users in the offshore industries have a tendency to doubt threaded connections due to issues of crevice corrosion and other 'hidden' issues. Moreover, threaded connections are normally limited to small sizes up to around 50 mm (2″) in diameter.

Flanged connections entail large space requirements and are weighty. Systems which use flanged connections require additional support due to their weight.

All of the problems indicated above are exacerbated by the large number of connections which may be required and the high operating pressures of many pipelines and pressure vessels. In an installation (for example a refinery) which employs many fluid containers (pressure vessels, pipelines etc.), a large number of connections may be needed to attach various instruments for monitoring quantities such as pressure and fluid flow. As indicated above, known connection arrangements are cumbersome and require a large amount of time and effort for connecting and disconnecting instruments, for example to carry out maintenance. Where many instruments and connections are provided, connection and disconnection times are an important consideration.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

According to an aspect of the invention, there is provided a connection module for connecting instrumentation equipment to a fluid container. The connection module includes a jointed tapping connector.

The jointed tapping connector can be used to account for misalignments when forming a tapping connection to a fluid container.

The fluid container can, for example, be a pressure vessel or a process line.

More than one jointed tapping connector can be provided. In such examples, each jointed tapping connector can be moveable independently of each other jointed tapping connector, thereby to provided additional flexibility.

The jointed tapping connector can be configured to move in a number of ways for correcting misalignments. For example, the jointed tapping connector can be pivotable and/or translatable.

In one embodiment, the jointed tapping connector includes a ball joint. In one embodiment, the jointed tapping connector comprises a double ball joint for additional flexibility.

A slotted positioning ring can be provided to aid orientation of the jointed tapping connector. One or more support members can be provided for supporting the connection module against a surface of the fluid container.

According to another aspect of the invention, there is provided a connector. The connector includes first and second opposed jaw members. The connector also includes a receiving space located substantially between the jaw members for receiving a protruded portion of a corresponding connector. The first jaw member includes a hook portion for hooking onto a formation of the protruded portion. The second jaw member includes an opening for slideably receiving a locking member of the corresponding connector.

This connector provides a convenient an efficient means by which, for example, modules in a modular connection assembly can be connected together.

In one embodiment, an indicator portion can be located substantially in the opening. In this way, when the locking member is slideably received in the opening, the indicator portion is displaced and at least partially protrudes from the opening. This serves to indicate that the locking member is received in the opening.

According to a further aspect of the invention, there is provided a connector. The connector includes a protruded portion configured to be received in a receiving space between first and second opposed jaws members of a corresponding connector. The protruded portion includes a formation for receiving a hook portion of the first jaw member. The protruded portion also includes a locking member configured to slideably engage with an opening of the second jaw of the corresponding connector.

In one embodiment, the locking member can be slideably mounted in an aperture of the protruded portion. The locking member can be resiliently biased to protrude from the aperture to be slideably received in the opening of the second jaw member.

In one embodiment, the locking member comprises a threaded portion for receiving a threaded tool. The tool can thereby be used for withdrawing the locking member into the aperture, thus disconnecting the connector from the corresponding connector.

In one embodiment, the locking member can be slideably mounted on a stopping member within the aperture. Engagement of the threaded tool with the stopping member and rotation of the threaded tool causes the locking member to ride along the thread of the threaded tool. This causes the locking member to be withdrawing into the aperture.

According to another aspect of the invention, there is provided a connector. The connector includes first and second opposed jaw members. The connector also includes a receiving space located substantially between the jaw members for receiving a corresponding connector. The first jaw member includes a hook portion for hooking onto the corresponding connector. The second jaw member includes a locking member for engaging with an opening of the corresponding connector.

According to a further aspect of the invention, there is provided a connector. The connector includes a protruded portion configured to be received in a receiving space between first and second opposed jaws members of a corresponding connector. The protruded portion includes a formation for receiving a hook portion of the first jaw member. The protruded portion also includes an opening for slideably receiving a locking member of the second jaw of the corresponding connector.

According to another aspect of the invention, there is provided a modular connection assembly for connecting instrumentation equipment to a fluid container. The assembly includes a connection module of the kind described above.

According to a further aspect of the invention, there is provided a module for a modular connection assembly. The connection assembly is suitable for connecting instrumentation equipment to a fluid container. The module includes a connector of the kind described above.

The module can be or can include a connection module of the kind described above.

According to another aspect of the invention, there is provided a modular connection assembly for connecting instrumentation equipment to a fluid container. The assembly includes a module of the kind described above.

According to a further aspect of the invention, there is provided a pressure vessel and a modular connection assembly of the kind described above connected to the pressure vessel.

According to another aspect of the invention, there is provided a process line and a modular connection assembly of the kind described above connected to the process line.

According to a further aspect of the invention, there is provided a method of connecting instrumentation equipment to a fluid container. The method includes connecting a module of the kind described above by adjusting an orientation of the jointed tapping connector.

According to another aspect of the invention, there is provided a method of connecting instrumentation equipment to a fluid container. The method includes hooking the hook portion of a connector of the kind described above on the formation of a connector of the kind described above. The method also includes aligning the opening to allow the locking member to slideably engage with the opening.

BRIEF DESCRIPTION OF THE DRAWINGS

Exemplary embodiments of the present invention will be described hereinafter, by way of example only, with reference to the accompanying drawings in which like reference signs relate to like elements and in which:

FIGS. 6, 7, 8A and 8B illustrate the degrees of freedom available to the jointed tapping connector shown in FIG. 4;

DETAILED DESCRIPTION OF THE INVENTION

Figure 1:
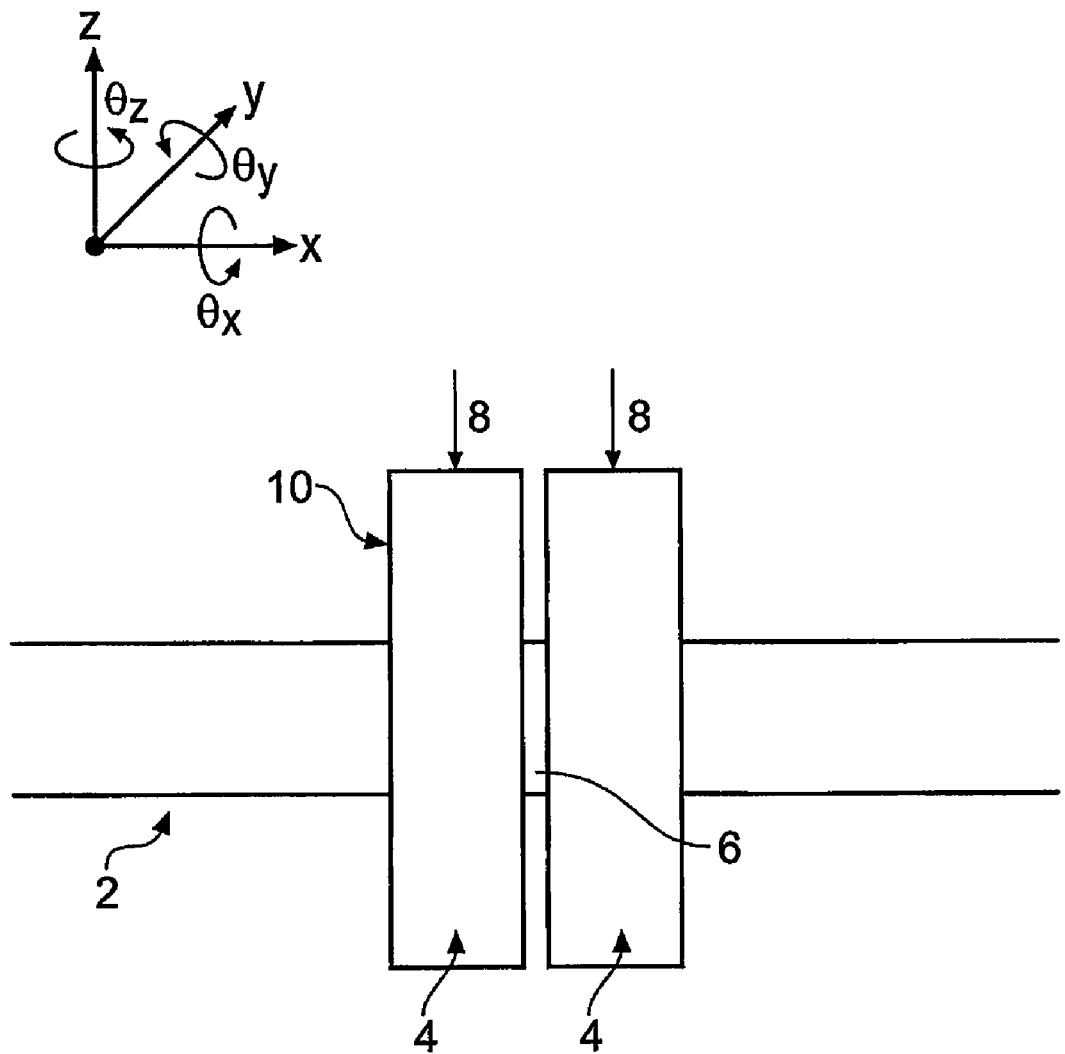
FIG. 1 shows an example of a process line and indicates typical positions for tapping connections.

Exemplary embodiments of the present invention are described in the following with reference to the accompanying drawings.

Embodiments of this invention provide a connection module. The connection module can be incorporated into a larger system such as a modular connection assembly, which includes other components, such as an instrument and/or one or more intermediate stages such as modules including valves and manifolds. Embodiments of this invention also provide a connector which is suitable for connecting together modules of a modular connection assembly of the kind described herein.

An example of a modular connection assembly according to an embodiment of the invention, and the modules which can be included in such a modular connection assembly are described below in relation to FIGS. 2A-D and 3A-D.

FIGS. 2A to 2D show a number of views of a connection module 20. The connection module is suitable for incorporation into a modular connection assembly as described above. The connection module includes first and second tapping connectors 50.

In this example, these are located adjacent each other, whereby they co-extend outwardly from a manifold section 30 of the connection module 20. The manifold section 30 includes manifolding which provides fluid communication between the tapping connectors 50 and corresponding outlets 32.

In the present example, and as described below in relation to FIGS. 3A-3D, the outlets 32 are connectable to an intermediate module of the modular connection assembly for subsequent fluid communication with an instrument. Fluid can thereby be passed to the instrument whereby measurements such as temperature and pressure measurements can be performed. In other examples, the outlets 32 can be connected directly to an instrument.

The manifold section 30 includes a pair of valves for sealing off a flow of fluid to the outlets 32. The valves can be operated using one of the respective levers 24 provided on the exterior of the manifold section 30.

FIGS. 3A to 3D show modules of a modular connection assembly connected to a pipeline 2. The modular connection assembly includes a connection module 20 of the kind shown in FIGS. 2A to 2D. In this example, the connection assembly connects directly to the flanges 4 of the pipeline 2, with one tapping connector being provided in either flange, on either side of an orifice plate (see FIG. 3D). Ports are provided at an exterior surface of the flanges 4 for connection to the tapping connectors 50. As described above, these ports may be misaligned to some extent.

Figure 3A:
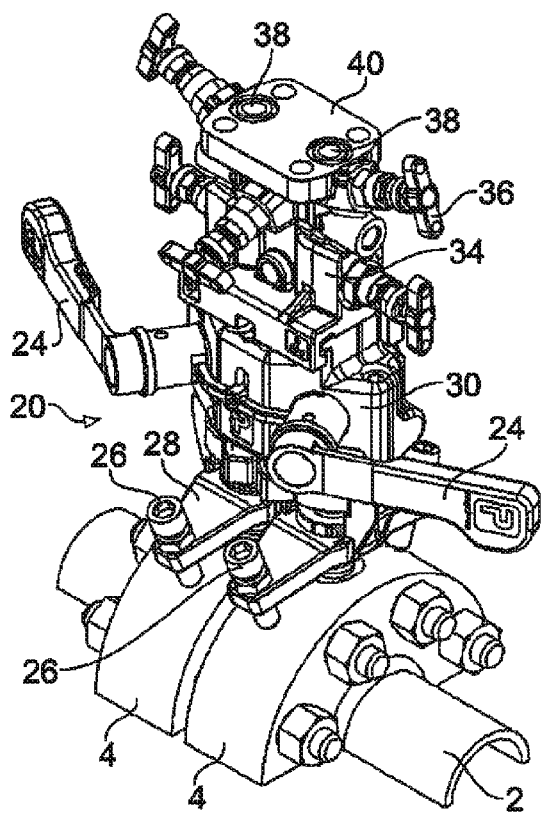
FIGS. 3A to 3D show a number of views of a connection module connected to a pipeline in accordance with an embodiment of the invention.
Figure 3B:
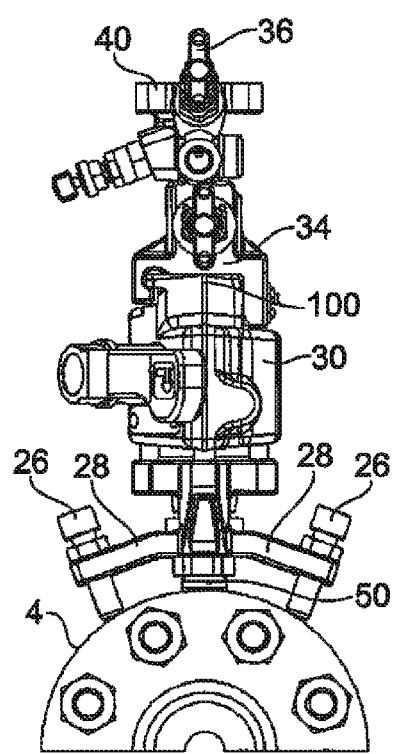
Figure 3C:
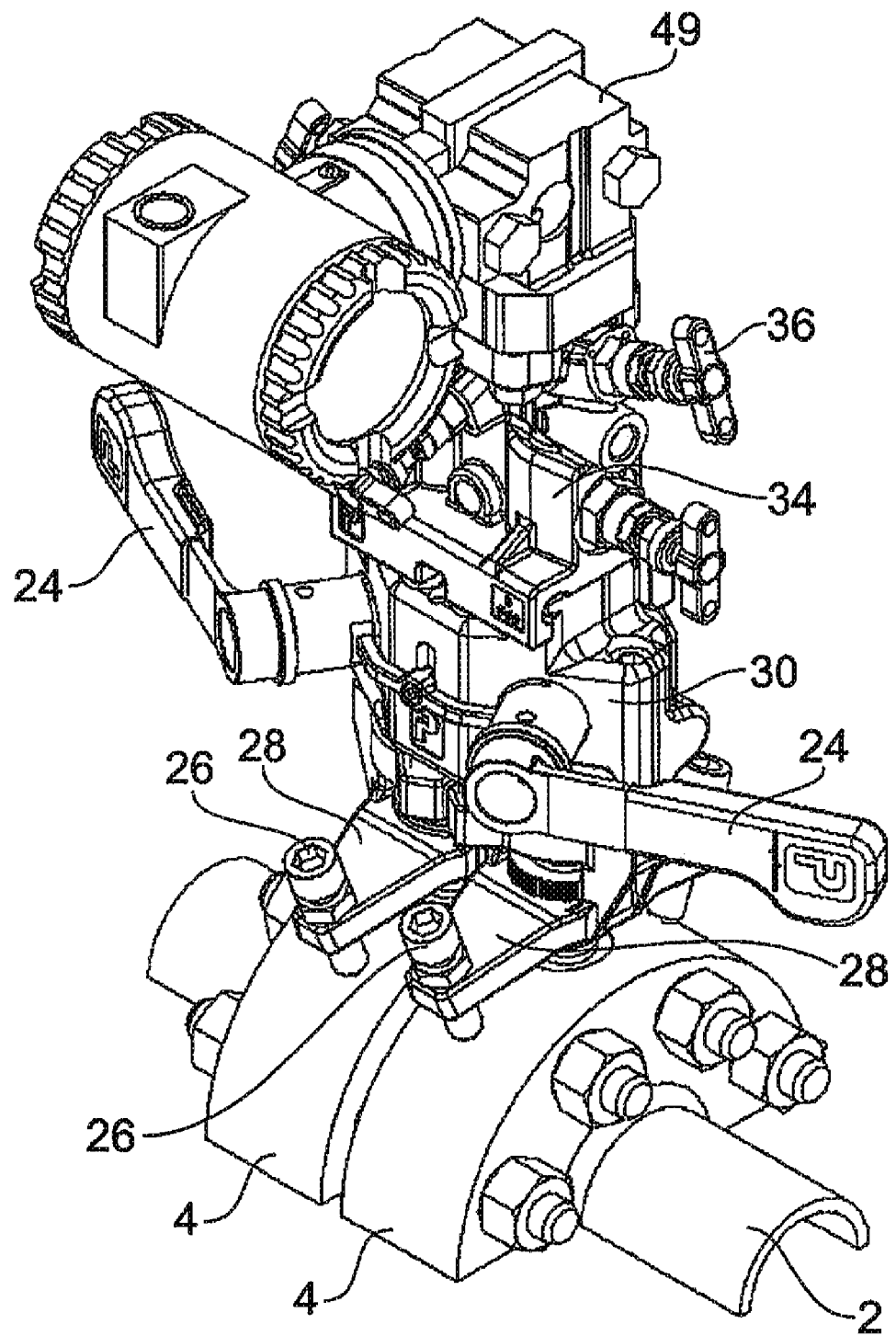
Figure 3D:
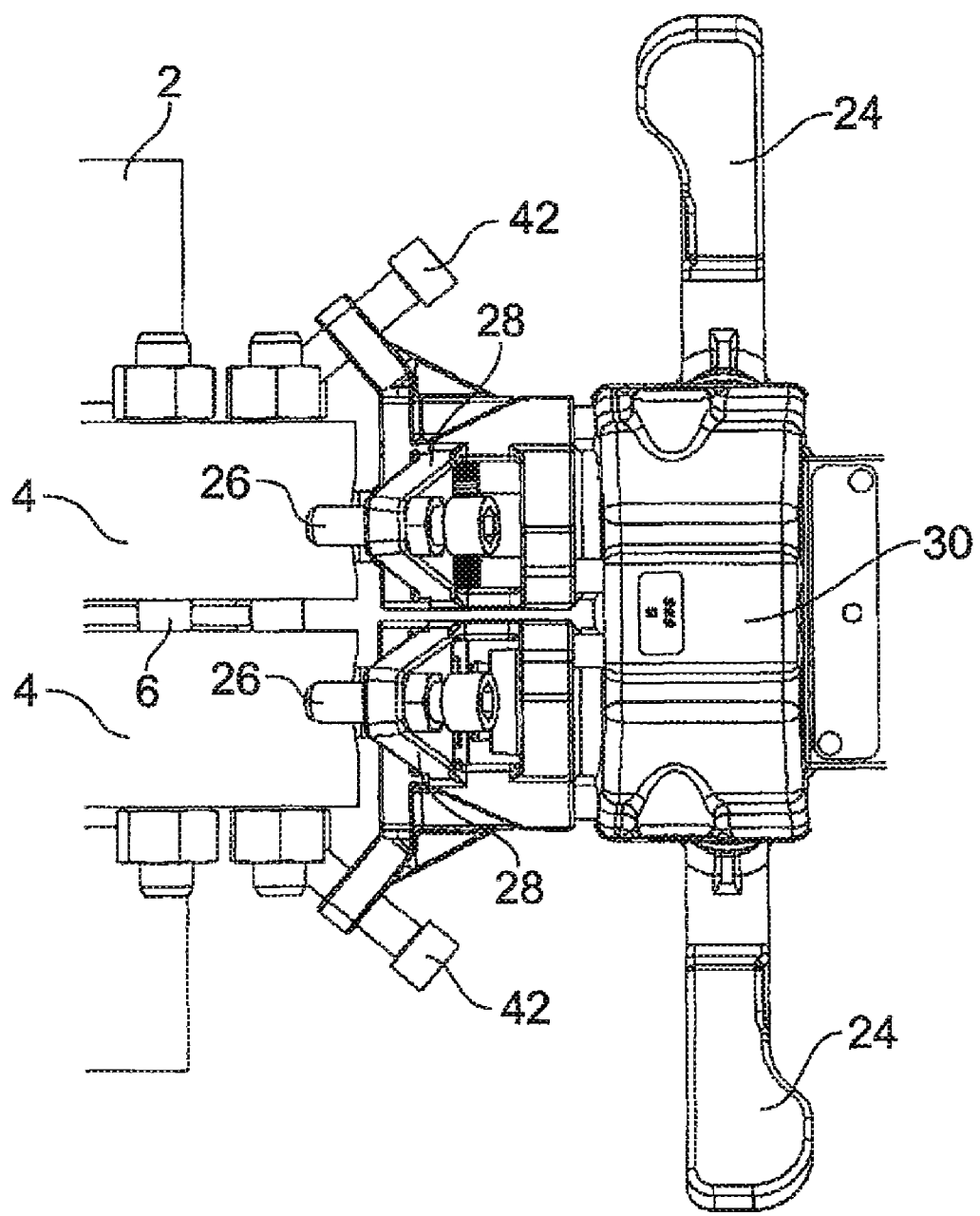

In the example shown in FIGS. 3A to 3C, the modular connection assembly is supported on the pipeline 2 by means of collars 28 through which the tapping connectors 50 extend to port with the flanges 4, and a series of bolts 26, which can be tightened against the outer surfaces of the flanges 4. Note that in FIG. 3D, additional bolts 42 are present to provide additional stability.

As shown in FIGS. 3A and 3B, the modular connection assembly in this example includes a connection module 20 to which there is connected an intermediate module 34. The intermediate module 34 includes manifolding in its interior for providing fluid communication between the outlets 32 of the manifold section 30 and an instrument (see FIG. 3C), which can be mounted on a receiving space 40 of the intermediate module 34. To this end, the intermediate module 34 includes outlets 38 which correspond to the outlets 32 of the manifold section 30. The intermediate module 34 includes a number of valves, which can be operated by means of corresponding levers 36 provided on the exterior of the intermediate module 34. Fluid flow within the intermediate module 34 can thereby be regulated.

FIG. 3C shows the modular connection assembly with an instrument 49 connected to the receiving port 40 of the intermediate module. As described above in other examples, the intermediate module 34 can be omitted, and an instrument 49 can be connected directly to a connection module such as connection module 20.

By providing a modular connection assembly, replacement and or maintenance of the various components is made easier since, for example, modules are readily replaced. Further-more, to carry out a different measurement on the pipeline, it is necessary merely to replace the instrument 49 with another instrument for carrying out the appropriate measurement.

A modular connection assembly in accordance with an embodiment of this invention can reduce connection and disconnection times, thereby reducing the time and effort required for interchanging different instruments and/or for removing instruments so that maintenance can be carried out.

As described above, the connection module 20 of the modular connection assembly includes two tapping connectors 50. The tapping connectors 50 generally comprise a tubular connection which can be attached to a port in a surface of a fluid container. For example, in FIGS. 3A to 3D, the modular connection assembly is shown to be connected to the flanges 4, pipeline 2 using the tapping connectors 50 of the connection module 20.

In accordance with an embodiment of this invention, the tapping connectors 50 are jointed, thereby providing the tapping connectors 50 with one or more degrees of freedom for movement. In this way, misalignment of the ports in a fluid container to which the tapping connectors 50 are intended to be connected can be corrected for by adjusting an orientation of the tapping connectors 50.

In accordance with an embodiment of the invention, a jointed tapping connector can be provided which allows for rotational and translational (lateral) movement. In accordance with another embodiment of the invention, a jointed tapping connector can be provided which allows for movement of the connector toward and away from the fluid container (these kinds of movements are referred to hereinafter as longitudinal movements since they are substantially parallel to an elongate portion of the tapping connector). A connection module can include one or both types of jointed taping connector. Where both kinds of jointed tapping connector are provided, their combined movements can allow for a combination of rotational, translational and longitudinal misalignments to be corrected for when connecting to a fluid container.

A first example of a jointed tapping connector 50 is described below in relation to FIGS. 4 to 8.

Figure 4:
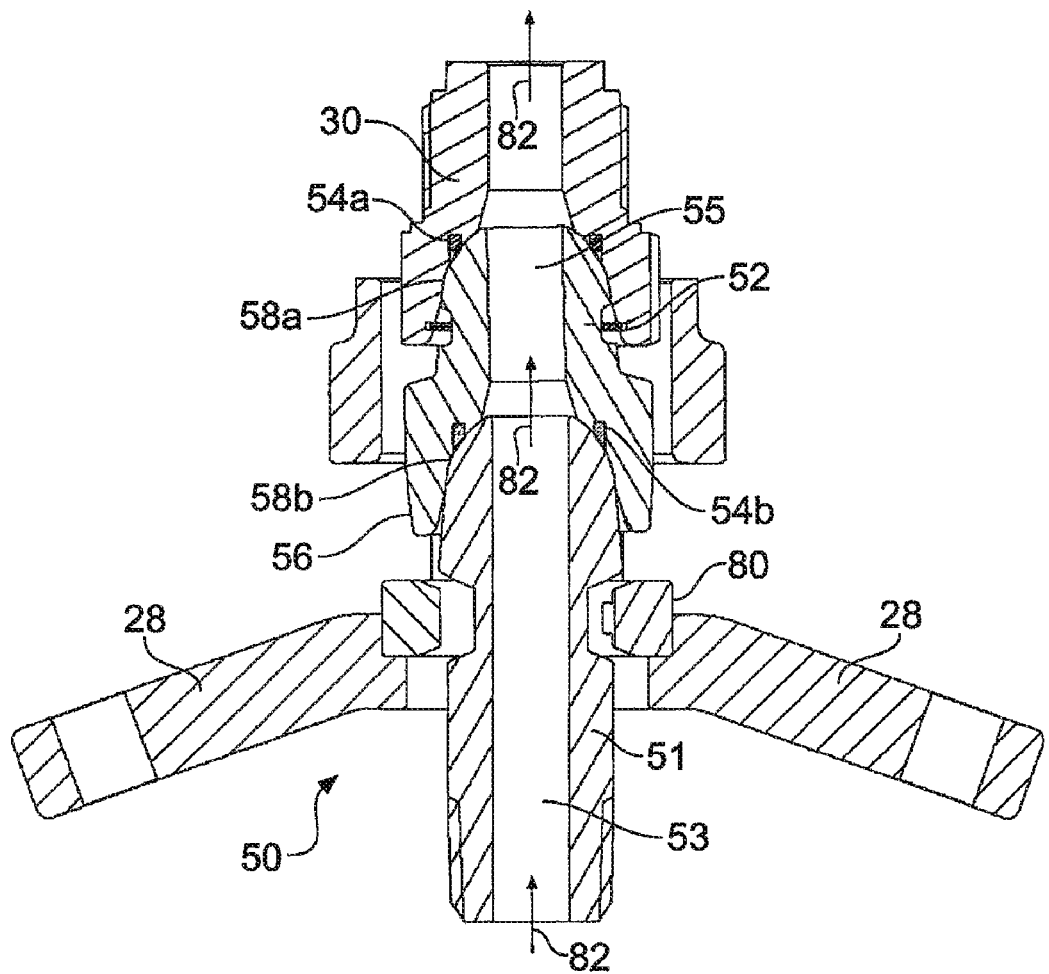
FIG. 4 shows a jointed tapping connector in accordance with an embodiment of the invention.

FIG. 4 shows a cross sectional view of a jointed tapping connector 50. In accordance with an embodiment of the invention, the jointed tapping connector can be provided with a ball joint, allowing the jointed tapping connector 50 to pivot with two rotational degrees of freedom. Additionally, in accordance with an embodiment of the invention, more than one ball joint can be provided to give further flexibility for the jointed tapping connector. One such example of a jointed tapping connector 50 is shown in FIG. 4, in which the jointed tapping connector 50 includes two ball joints. It is envisaged that more than two ball joints can be provided in accordance with system requirements with regard to flexibility.

In FIG. 4, the jointed tapping connector 50 is shown to be connected to the manifold section 30 of a connection module 20. The jointed tapping connector 50 includes an elongate portion 51 and a swivel joint component 56. The swivel joint component 56 is located intermediate the elongate portion 51 and the manifold section 30. The swivel joint component 56 is jointed to the manifold section 30 with a ball joint 58*a*. The swivel joint component 56 is also jointed to the elongate portion 51 with a ball joint 58*b*. Accordingly, the swivel joint component provides a double ball joint connection between the manifold section 30 and the elongate portion 51.

In use, fluid tapped from a fluid container by the tapping connector 50 passes through apertures 53 and 55, which are provided in the elongate portion 51 and the swivel joint component 56, respectively, to flow from the fluid container into the manifold section 30 of the connection module 20 in the direction shown generally by the arrows labelled 82 in FIG. 4. In order to provide a water-tight seal around the ball joints 58*a* and 58*b*, seals 54*a* and 54*b* can be provided for the respective ball joints 54*a* and 54*b*. These seals can, for example, be in the form of a rubber O-ring or a compressible gasket. Also, in the example shown in FIG. 4, a retaining ring 52 is provided between the manifold section 30 and the swivel joint component 56 in the vicinity of the ball joint 58*a*. The purpose of the retaining ring 52 is to retain the swivel joint components within the corresponding section of the manifold section 30, thereby to ensure the integrity of the ball joint 58*a*.

As will be described below, the provision of one or more ball joints for a tapping connector 50 constitutes one example of how a jointed tapping connector can be afforded one or more degrees of freedom (e.g. rotational and/or translational). In the example shown in FIG. 4, the elongate portion 51 of the jointed tapping connector 50 extends through an aperture provided in the collar 28. As described in relation to FIGS. 3A-3D, the sleeves provide support for the connection module 20 by allowing bolts such as the bolts 26 shown in FIGS. 2B, 2D and 3A-3D to be tightened against an outer surface of a fluid container.

Figure 5:
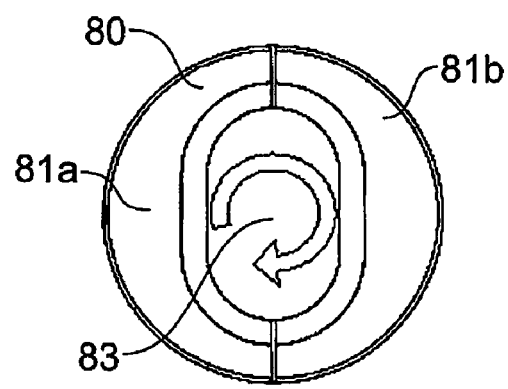
FIG. 5 shows a slotted positioning ring for the jointed tapping connector shown in FIG. 4 in accordance with an embodiment of the invention.

In the example shown in FIG. 4, the connection module 20 is provided with a positioning ring 80. The positioning ring 80 is supported within the collar 28. Another view of the positioning ring 80 is shown in FIG. 5. From FIG. 5, it can be seen that the positioning ring can include two halves 81*a* and 81*b*, which come together to define a slot 83. The slot 83 provides an aperture through which the elongate portion 51 of the jointed tapping connector 50 can pass. The positioning ring serves to apply a compressive force against the elongate portion 51 for retaining the elongate portion 51 in its chosen position after orientation as discussed below.

FIGS. 6 to 8 show examples of the degrees of freedom which are available to a jointed tapping connector, which includes a double ball joint connection as indicated above.

The provision of a jointed tapping connector 50 which has a single ball joint allows rotational movements of the jointed tapping connector 50 (or, for example, of an elongate portion of the jointed tapping connector such as the elongate portion 51 shown in Figures).

As illustrated in FIGS. 6 to 8, provision of a double ball jointed tapping connector 50 affords translational as well as rotational degrees of freedom for the tapping connector (elongate portion 51).

In FIG. 6, it is illustrated that the double ball jointed connection allows translational movement of the elongate portion 51. The translational movement is provided by rotation of the swivel joint component 56 between the manifold section 30 and the elongate portion 51. In FIG. 6, the centre line of the inlet of the manifold of section 30 is indicated by the line labelled 60. The centre line of the elongate portion 51 is indicated by the line 62. In the position of the elongate portion 51 shown in FIG. 6, the centre line 62 does not coincide with the centre line 60 as it would were the swivel joint component in an unrelated state. This demonstrates that rotation of the swivel joint component 56 between the manifold section 30 and the elongate portion 51 allows for translational movement of the elongate portion 51 relative to the manifold section 30. It will be appreciated that since the swivel joint component 56 can rotate in two rotational directions (clockwise and anti-clockwise as shown in FIG. 6, as well as clockwise and anti-clockwise in the plane perpendicular to the page), translational movement of the elongate portion 51 relative to the manifold section 30 is possible in two orthogonal linear directions (these correspond to the directions x and y illustrated in FIG. 1). Translational movement of this kind allows for translational mis-orientations of the ports provided on a fluid container to be corrected for.

In FIG. 7, it is shown that rotation of the swivel joint component 56 in conjunction with rotation of the elongate portion 51 can provide for two rotational degrees of freedom for the elongate portion 51. It will be noted that rotational movement of this kind can be combined with translational movement of the kind described in FIG. 6. In FIG. 7, the centre line of the inlet of the manifold section 30 is shown by the line 60, while the centre line of the elongate portion 51 of the jointed tapping connector 50 is shown by the line 64. This illustrates that the elongate portion 51 is rotated with respect to the manifold section 30.

This rotational movement allows for rotational misalignments of the ports in a fluid container to be corrected for when connecting a connection module to the fluid container.

It will be appreciated that rotational movement of this kind can be provided in more than one rotational direction. This is illustrated by FIGS. 8A and 8B. In FIGS. 8A and 8B the elongate portion 51 has been rotationally re-aligned with respect to the manifold section 30 in two dimensions. The degree of rotation in one of those dimensions can be deduced from the rotation of the centre line 64A of the elongate portion 51 relative to the centre line 60 of the manifold section 30 shown in FIG. 8A. The degree of rotation in the other rotational direction can be deduced from the degree of rotation between the centre line 60 and the centre line of the elongate portion 51, which is labelled 64b in FIG. 8B.

Combinations of translational (lateral) and rotational movement can be used to account for and correct for misalignments in the ports provided in fluid containers as described above.

Returning now to FIG. 4, to connect the connection module 20 to a fluid container, the jointed tapping connector 50 is aligned appropriately with respect to a port of the fluid container. The elongate portion 51 is then attached to the port. This can be done, for example, using a screw thread attachment or by welding. In order to retain the jointed tapping connector in its correct orientation, pressure is applied to the elongate portion 51 by means of the positioning ring 80 and collar 28. Once the elongate portion 51 has been attached to the port of the fluid container (e.g. pipeline 2), bolts 22 are tightened. This causes an upper edge of the positioning ring 80 to urge against a slot which can be provided in the elongate section 51, thereby to push the elongate section inwards and towards the manifold section 30. This compresses the seals 54a and 54b thereby providing a fluid-tight connection between the manifold section 30, the swivel joint components 56, and the elongate portion 51. This also serves to retain the swivel joint component 56 and elongate portion 51 in their correct orientation.

Figure 2C:
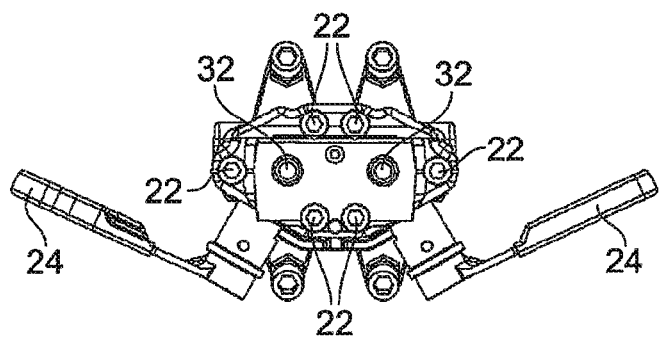
FIGS. 2A to 2D show a number of views of a connection module in accordance with an embodiment of the invention.
Figure 2B:
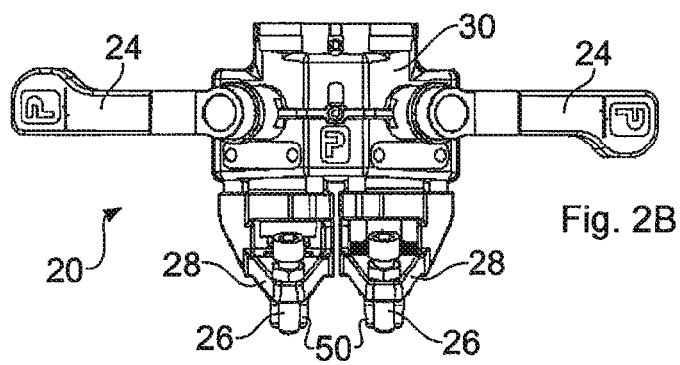
Figure 2D:
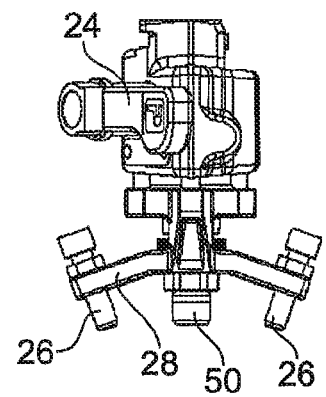
Figure 2A:
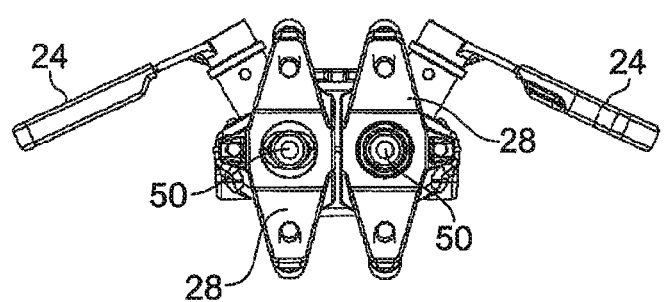

With reference to FIGS. 2C and 3A, it will be appreciated that, in this example, access to the nuts 22 for tightening and untightening the ball joints is only available when the intermediate module 34 is disconnected from the manifold section 30. As will be described below, the safety features of a connector described herein can prevent inadvertent disconnection between modules such as the intermediate module 34 and the manifold section 30. Accordingly, these safety features can prevent access to the nuts 22, thereby inhibiting inadvertent disengagement of the elongate portion 51.

As described above, and as shown in FIG. 3D, additional bolts 42 can be provided to provide lateral stability for the modular connection assembly. These are provided on members which extend outwardly from the manifold section 30. As described above, this has the benefit of providing additional support for the modular connection assembly. This is especially useful where the additional weight of an intermediate module 34 and a potentially heavy instrument is present.

Figure 9:
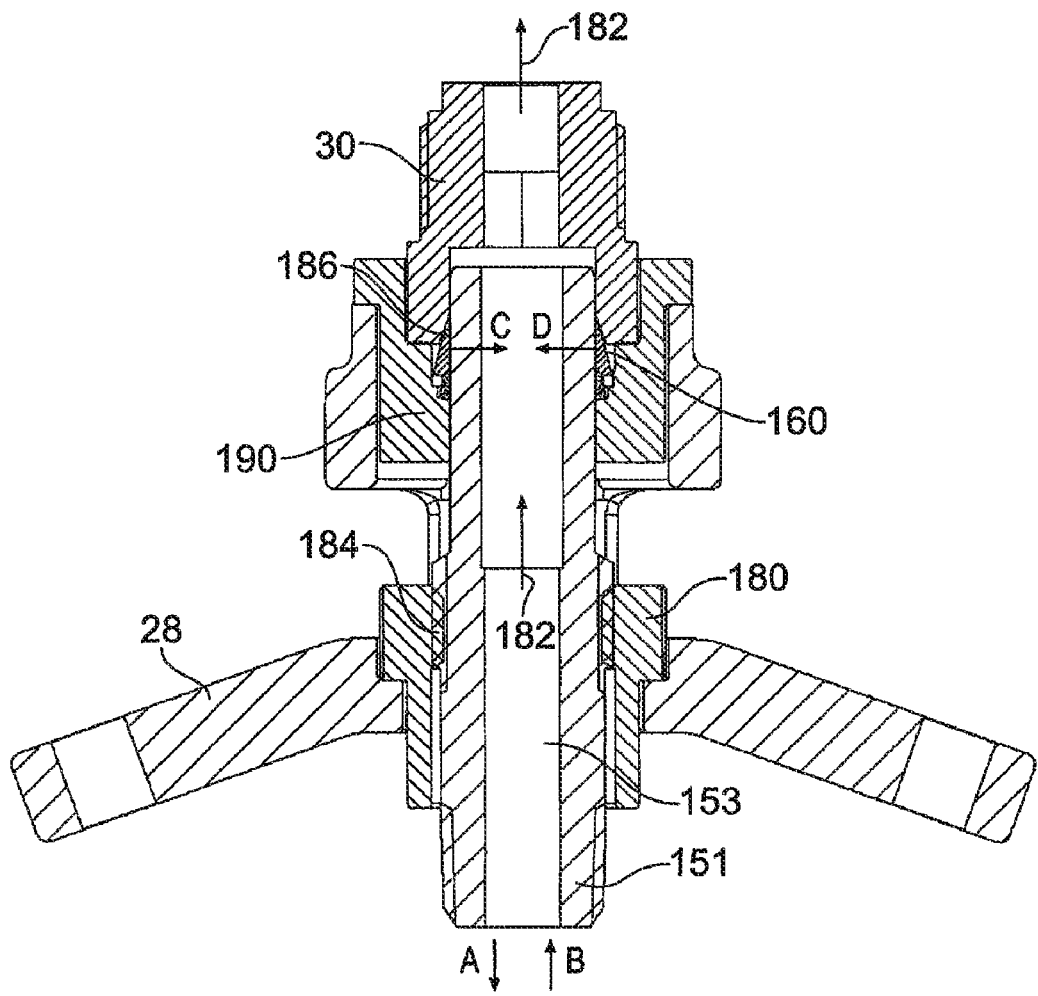
FIG. 9 shows a jointed tapping connector in accordance with an embodiment of the invention.

Another example of a jointed tapping connector is now described in relation to FIG. 9. This kind of jointed tapping connector is slideably jointed, and can allow for longitudinal misalignments to be corrected for, when attaching a connection module to a fluid container.

The jointed tapping connector includes an elongate portion 151, which extends away from the manifold section 30 for connection to a fluid container. As described below, the elongate portion is moveable back and forth along a longitudinal direction indicated by the arrows labelled A and B in FIG. 9. The elongate portion 151 includes an aperture 153, through which fluid can flow from a fluid container into the manifold section 30 along the direction shown by the arrows labelled 182 in FIG. 9.

The elongate portion 151 extends through a collar 28. A nut 180 can also be rotationally mounted within the collar 28. The nut 180 can include a screw thread, and a corresponding screw thread can be provided on the elongate portion 151. The screw threads are shown generally at 184 in FIG. 9.

The tapping connector can also include means such as an interference fit 160, which can form a seal between the elongate portion 151 and the manifold section 30.

To connect the manifold section 30 to a fluid container, the manifold section 30 is positioned over a port in the fluid container such that the elongate member 151 engages with the port. In this position, as described above in relation to FIGS. 3A to 3D, the manifold section 30 and any further components attached thereto (for example, an instrument) can be supported against an outer surface of a fluid container by means of the collar 28 and a series of bolts 26 and additional bolts 42.

Since the elongate portion 151 is slideably moveable relative to the connection module in the directions shown by arrows A and B, once the manifold section 30 has been manoeuvred into the desired position, relative movement of the elongate portion 151 with respect to the manifold section 30 can be used to correct for longitudinal misalignments in the port of the fluid container.

Once the elongate portion 151 is in the desired position for forming a tapping connection with the fluid container, a seal can be formed between the elongate portion 151 and the manifold section 30. This can be achieved by clamping the collar 28 toward the manifold section 30 using a large screw thread arrangement or bolts such as bolts 22 (FIG. 2C). When such bolts are tightened, this has the effect of pushing a compression sleeve 190 onto the compression fitting 160. This in turn causes the compression fitting 160 to apply a compression force inwardly against the elongate portion 151, as represented by the arrows labelled C and D in FIG. 9. Additionally, the compression fitting 160 presses against the connection module at 186. Thus, a seal is formed which prohibits leakage of fluid from the aperture 153.

To reduce the load which is applied to the compression fitting 160, the nut 180 can be tightened onto the screw thread of the elongate portion 151. When screwed in place, the nut 180 fixes the elongate portion in place and urges against the collar 28, thereby preventing too great a load being applied to the compression fitting where it meets the connection module at 186.

Thus there has been described a slideably jointed tapping connector which can be used to account for and correct for longitudinal misalignments between the ports provided in fluid containers as described above.

In some examples, a connection module with only a single tapping connector may be required. In accordance with an embodiment of this invention, this tapping connector would be a jointed tapping connector such as that described above.

In other examples, more than one tapping connector can be provided in a connection assembly. For example, a fixed tapping connector and a jointed tapping connector can be provided. Alternatively, more than one jointed tapping connector can be provided. For example, two rotatable/translatable connectors or two slideably jointed tapping connectors can be provided. In another example, combinations of different types of jointed tapping connectors can be provided (for example, one rotatable/translatable connector and one slideably jointed tapping connector). This combination can allow different types of misalignment to be corrected for in a single manifold section 30.

In the embodiments described above in relation to FIGS. 2A to 2D and 3, the connection assembly includes two tapping connectors. In that example, both tapping connectors can be jointed tapping connectors of the kind described in relation to FIGS. 4 to 9. In other examples, one of the tapping connectors can be a fixed tapping connector, and the other tapping connector can be a jointed tapping connector. In this way, misalignment between two ports can be accounted for by installing the fixed tapping connector into one of the ports and then realigning the jointed tapping connector to account for any misalignment of the ports. As described above, it will be appreciated that using combinations of fixed and jointed tapping connectors in this way can be used in connection assemblies comprising more than two tapping connectors.

With reference to FIG. 1, it will be appreciated that using a connection module including two jointed tapping connectors, one being a slideable tapping connector as described in relation to FIG. 9, and the other being a rotational/translational as described in relation to FIGS. 4 to 8, misalignments of the two flanges 4 in the x, y and z direction as well as in the rotational directions $\theta_x$, $\theta_y$, and $\theta_z$ can all be accounted for. A connection module 20 of the kind shown in FIGS. 2A to 2D and 3, which includes two jointed tapping connectors, can include one tapping connector of each type. Installation of such a connection module 20 will now be described with continued reference to FIGS. 1 to 9.

To connect a connection module 20 including the two kinds of jointed tapping connector to a fluid conduit, the connection module 20 is first positioned over ports which are provided in the fluid container. At this stage, the elongate portion 151 of the slideably mounted jointed tapping connector can be manoeuvred into place and engaged with a first port of the fluid container. The elongate portion 51 of the rotatable/translatable connector can be loosely positioned for subsequent engagement with another port of the fluid container.

The compression fitting 160 of the slideably jointed tapping connector can then be sealed as described in relation to FIG. 9, by upward compression of the collar 28 and compression collar 190 and tightening of the nut 180.

After positioning, engagement and sealing of the slideably jointed tapping connector, the rotatable/translatable tapping connector can be connected to the second port of the fluid container. It will be appreciated that at this stage, the slideable movement of the slideably jointed tapping connector allows correct positioning of the rotatable/translatable tapping connector to account for any longitudinal misalignment (see, for example, the z-direction indicated in FIG. 1) between the two ports of the fluid container.

The elongate member 51 of the rotatable/translatable tapping connector can then be positioned as described in relation to FIGS. 6 to 8 above, to account for any rotational/translational misalignments between the two ports. Once in position, the rotatable/translatable tapping connector can be sealed as described in relation to FIG. 4 by compression of the collar 28 and positioning ring 80 toward the connection module 20. Finally, the bolts 26 and 42 can be adjusted if so desired.

It will be appreciated that the connection process is simple to perform, and can be completed very quickly (for example, less than a minute). Disconnection of the connection module 20 from the fluid container is equally fast. This is in contrast to the older, cumbersome connection systems described above, which take far longer to connect and disconnect.

Accordingly, there has been described a connection module for connecting instrumentation equipment (for example, a measuring instrument) to a fluid container such as a pipeline. The connection module includes one or more jointed tapping connectors. The jointed tapping connector allows misalignments to be accounted for when connecting a connection module of, for example, a modular connection assembly to a fluid container.

Embodiments of this invention also provide a connector. The connector can be used for connecting together two objects. In the examples described herein, these objects can be modules of a modular connection assembly. The connector as described herein allows separate objects such as modules in the modular connection assembly to be connected and unconnected in a manner which is swift, convenient and robust.

An example of the connector is described below in relation to FIGS. 10A to 13.

Figures 10A, 10B:
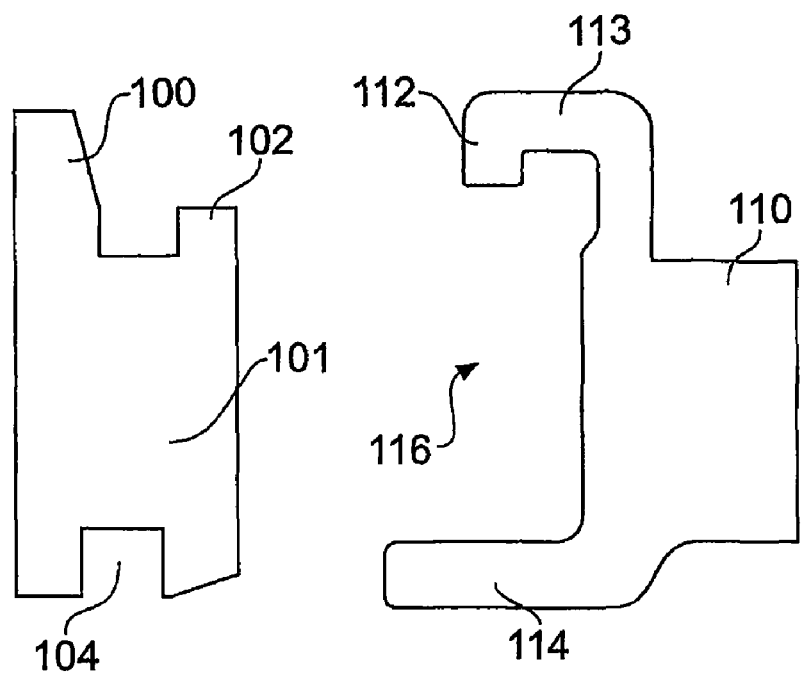
FIGS. 10A and 10B show the connectors of a connection system in accordance with an embodiment of the invention.

FIGS. 10A and 10B shows a first view of a connection system in accordance with an embodiment of this invention. As shown in FIGS. 10A and 10B, the connection system includes a connector 100 and a corresponding connector 110. In FIGS. 10A and 10B, the connector 100 and corresponding connector 110 are shown in their unconnected states.

As used herein, the terms "connector" and "corresponding connector" are interchangeable in so far as each connector in the connection system corresponds to the other connector in the connection system.

As can be seen from FIG. 10B, the corresponding connector 110 includes a hook portion 112. The hook portion 112 is configured to hook onto a formation 102, which is provided on the connector 100. The corresponding connector 110 includes first and second jaws 113 and 114. The hook portion 112 is comprised in the first jaw 113. The corresponding connector 110 also includes a receiving space 116, which is located substantially in between the first and second jaws 113 and 114. The receiving space is configured (e.g. in terms of size and shape) to receive a protruded portion 101 of the connector 100.

In the example shown in FIGS. 10A and 10B, the connector 100 includes an opening 104. The opening 104 is configured to receive a locking number which can extend slideably from the second jaw 114 of the corresponding connector 110. As will be described below in more detail, this arrangement can be substantially reversed, whereby an opening can be provided in the second jaw 114 of the corresponding connector 110, thereby to slideably to receive a locking member which protrudes from the protruded portion 101 of the connector 100.

Figure 11:
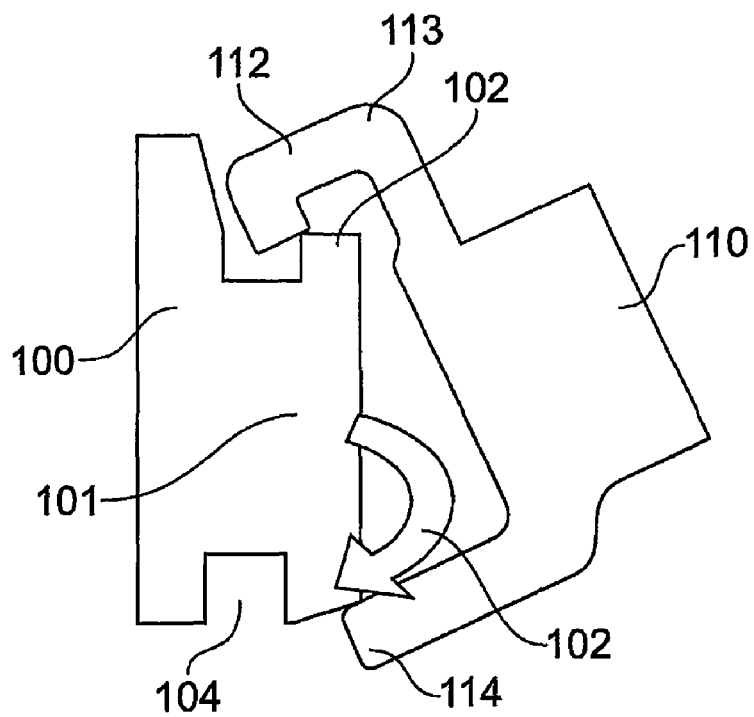
FIGS. 11 and 12 illustrate how the connectors shown in FIGS. 10A and 10B can be connected together in accordance with an embodiment of the invention.

FIG. 11 shows how the connector 100 and the corresponding connector 110 can be connected together.

As shown in FIG. 11, to connect the connector 100 to the corresponding connector 110, the hook portion 112 of the corresponding connector 110 can first be hooked onto or engaged with the formation 102 provided in the protruded portion 101 of the connector 100. Once the hook portion 112 has been hooked onto the formation 102, the corresponding connector 110 can be pivoted as indicated by the arrow labelled 102 in FIG. 11, whereby the second jaw 114 can engage with a bottom portion of the protruded portion 101 of the connector 100. As the lower jaw member 114 of the connector 110 passes along the lower portion of the protruded portion 101, the locking member, provided either in protruded portion 101 or in the second jaw member 114, can slideably engage with an opening provided in either the lower jaw member 114 or in the protruded portion 101, respectively.

Figure 12:
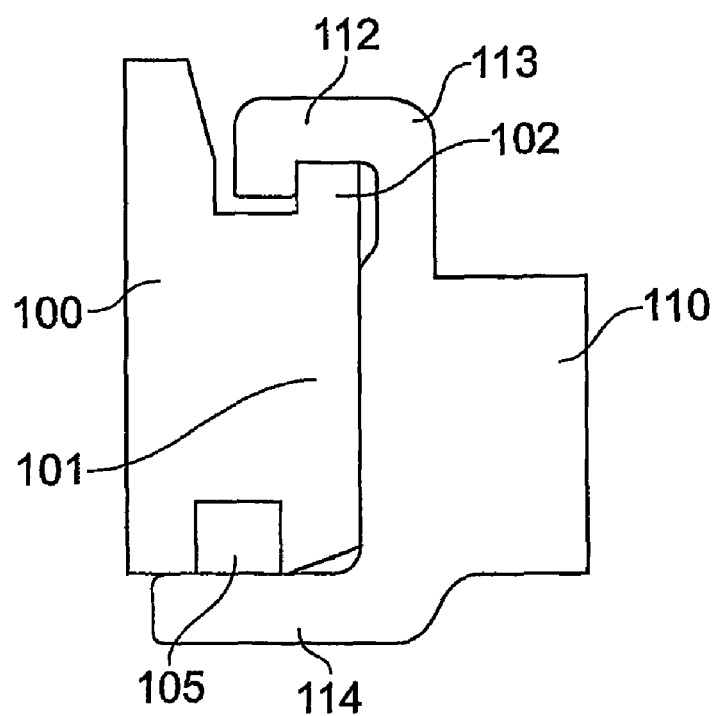

FIG. 12 shows the connection system in a connected state, with the connector 100 connected to the corresponding connector 110. In the connected state, the hooked portion is hooked onto the formation 102, and a locking mechanism, shown generally at 105 is engaged. As indicated above, this can involve a locking member being slideably received in an opening. The opening and the locking member can be provided in the protruded portion and second jaw member 114, respectively, or vice versa.

Figure 13:
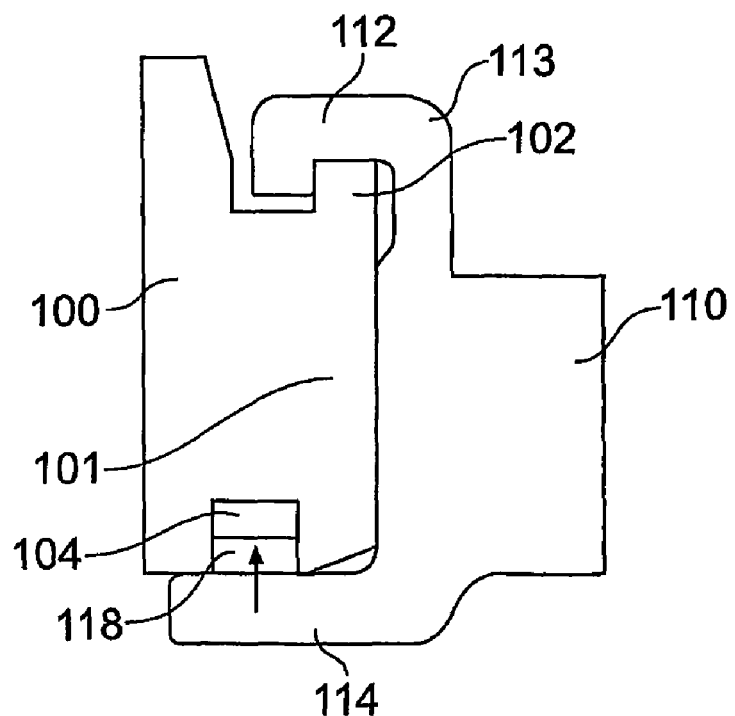
FIG. 13 shows the connectors shown in FIGS. 10A and 10B in their connected state.

In FIG. 13 it is shown that a locking member 118 can be slideably received (in a direction indicated by the arrow) from the second jaw member 114 into an opening 104 provided in the protruded portion 101 of the connector 100.

The connector as described above can be incorporated into the modules of a modular connection assembly to provide means by which the modules of the assembly can be connected together. The hooking and pivoting motion which is required for connecting the two modules together using these connectors is simple to perform and requires no special tools. To disconnect the connectors, it is necessary to disengage the locking member 118 and then pivot the corresponding connector 110 in a direction substantially opposite to the direction as shown by the arrow 112 in FIG. 11, followed by unhooking of the hook portion 112 from the formation 102.

Figure 14:
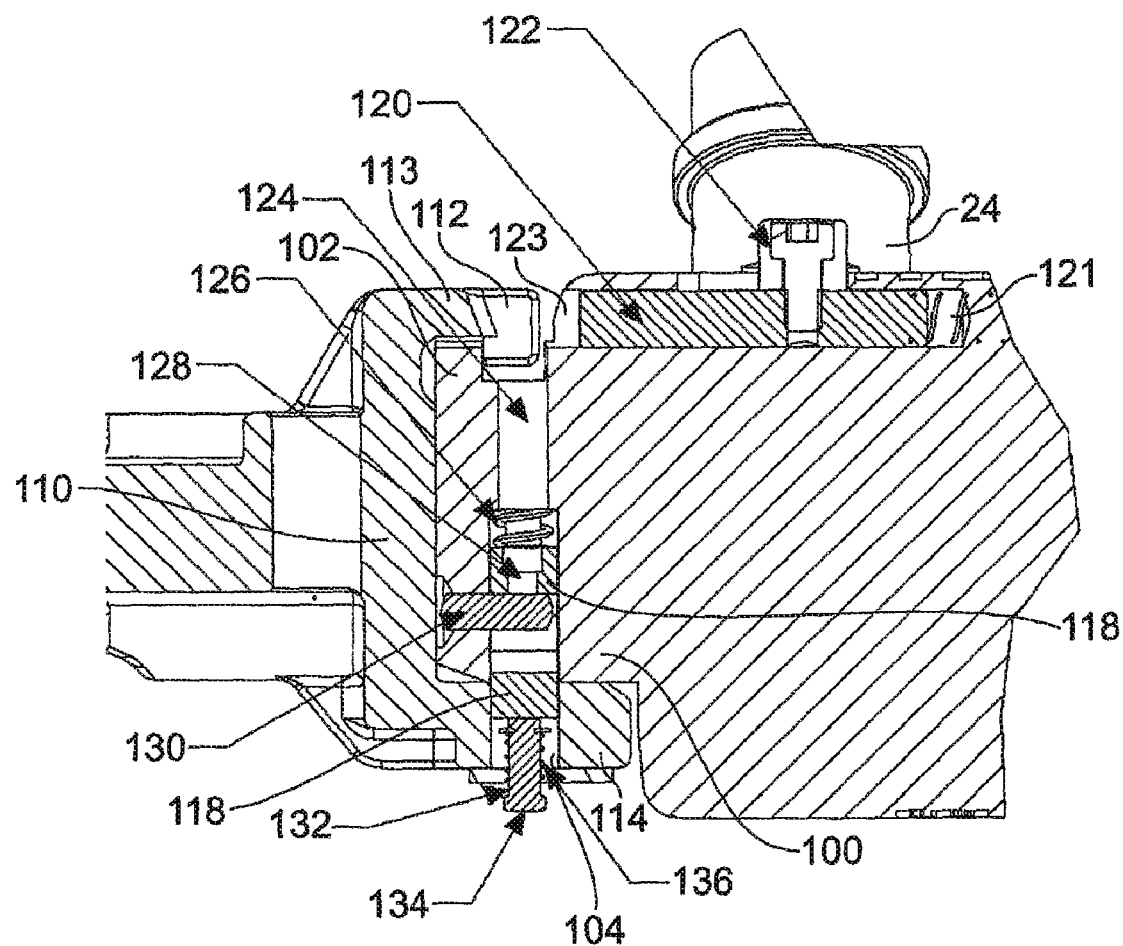
FIGS. 14 and 15 show a modular connection system in accordance with an embodiment of the invention.
Figure 15:
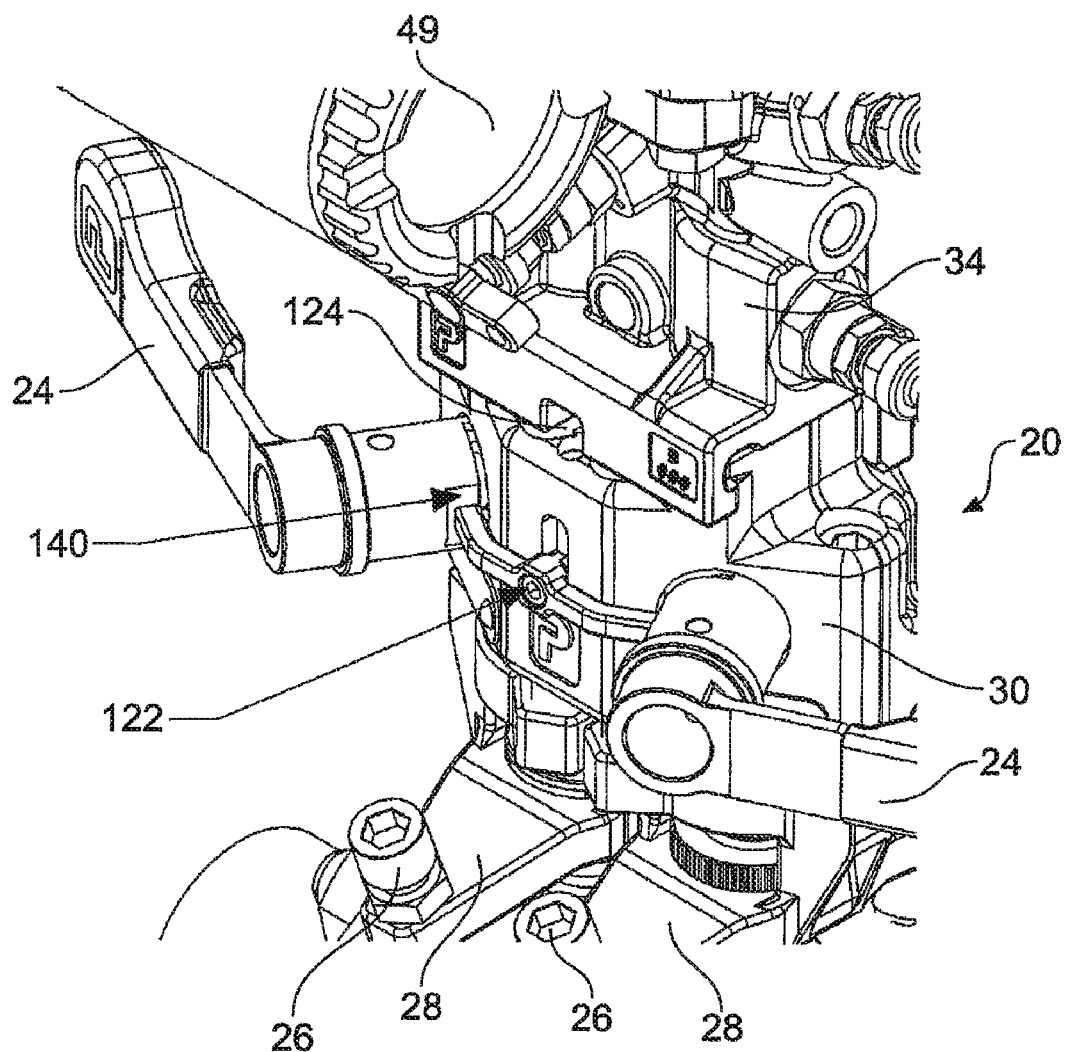

FIGS. 14 and 15 illustrate an example of a connection system which is incorporated into the modules of a modular connection assembly. In this example, the connector 100 is provided in a connection module 20 of the kind described above in relation to FIGS. 3A to 3C. The corresponding connector 110 is incorporated into an intermediate module 34 of the kind described above in relation to FIGS. 2A to 2D and 3. In FIG. 14, the connection system is shown in its connected state, whereby the connection module 20 is connected to the intermediate module 34 and in this view with connector 100 is on the right and corresponding connector 110 is on the left.

In the example shown in FIG. 14, a locking member 118 is provided substantially within an aperture 124 in the protruded portion 102 of the connector 100. The locking member 118 is slideably mounted within the aperture. The locking member in this example is biased to protrude out of the aperture 124 by a biasing element 126. The biasing element 126 is, in this example, a helical biasing spring 126, although other biasing means could be employed (e.g. leaf spring).

As is shown in FIG. 14, the locking member 118 is biased to protrude out of the aperture 124 and into an opening 104, which is provided in the second jaw 114. In this example, a stopping member 130 can be provided in the protruded portion 102 of the connector 100. The stopping member 130 extends into the aperture 124. In this example, the locking member 118 includes a slot within which the stopping member 130 is received. Accordingly, the locking member 118 in this example is slideably mounted on the stopping member 130.

To connect the connector 100 to the corresponding connector 110, the steps described above in relation to FIGS. 10A to 13 can be performed. An example of how the connectors can be disconnected is now described in relation to FIGS. 14 and 15.

To disconnect the connector 100 from the connector 110 it is necessary to disengage the locking member 118. To do this, the locking member 118 can be withdrawn into the aperture 124 and out of the opening 104 in the second jaw 114. To do so, a threaded tool can be inserted into the aperture 124 at an end of the aperture 124 opposite where the locking member 118 protrudes from the aperture 124. The end of the locking member 118 distal the second jaw 114 includes an opening 128 which is threaded with a thread which corresponds to the thread of the threaded tool. To withdraw the locking member 118 into the aperture 114, the threaded member is screwed into the opening 128 until it abuts the stopping member 130. Then, the user continues to rotate the threaded tool such that the locking member 118 rides up along the thread of the threaded tool, thereby withdrawing the locking member 118 into the aperture 124. Note that this withdrawing of the locking member 118 into the aperture 124 is resiliently opposed by the biasing spring 126. Once the locking member 118 has been sufficiently withdrawn such that it is no longer engaged with the opening 104 of the second jaw 114, the corresponding connector 110 can be pivoted and unhooked from the connector 100 substantially as described above.

The example shown in FIGS. 14 and 15 includes a safety mechanism for preventing the connection system from being disconnected while the valves in the connection module 20 are open. The safety mechanism includes a slideable member 120 which is received in a slot 123 in the connection module 20. The slideable member 120 can be biased with a biasing element such a helical spring 121. When the slideable member 120 protrudes from the slot 123, it covers the aperture 124. When connecting the connector 100 to the corresponding connector 110, the slideable member 120 is pulled back from the aperture 124. This pulling back can be achieved by means of a handle 122 which protrudes from a side of the manifold section 30. It should be noted that in this example, the handle 122 is receivable within grooves 140 which are provided within the levers 24. However, these grooves are orientated within the levers 24 such that the grooves only align with the handle 122 when the levers 24 are positioned such that the corresponding valves within the manifold section 30 are in their closed position. Accordingly, movement of the slideable member 120 using the handle 122 is only achievable when the valves in the connection module are closed. Accordingly, it is not possible to achieve access to the aperture 124 in the connector 100 for inserting a threaded tool to disconnect the connector 100 from the corresponding connector 110, unless the valves in the manifold section 30 are closed. Accordingly, disconnection of the connection module 20 and the intermediate module 34 while the valves of the connection module 20 are open is prevented.

Figure 16A:
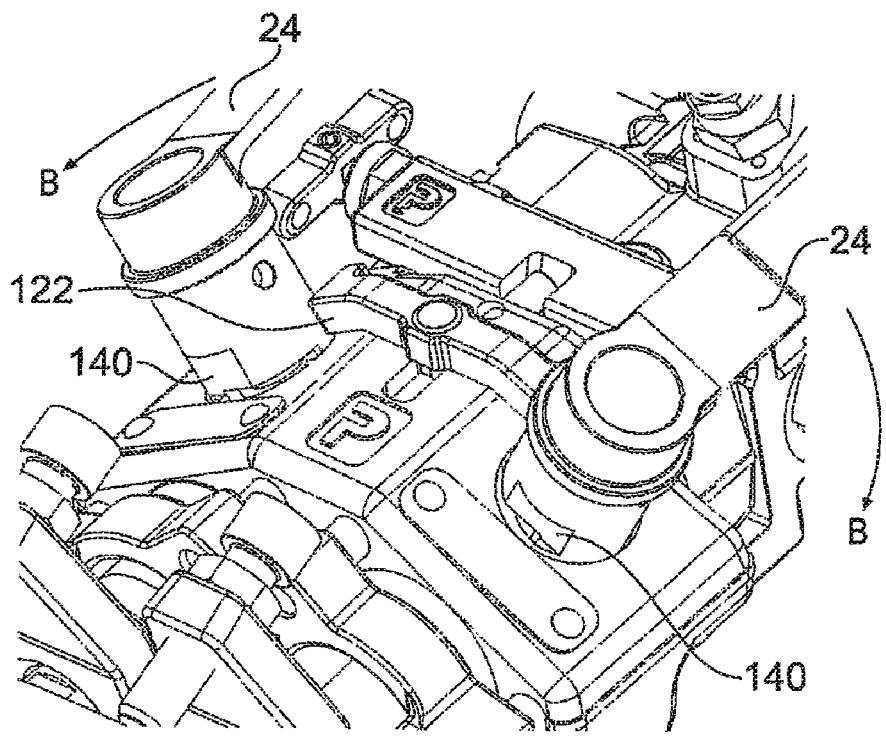
FIGS. 16A and 16B illustrate a locking feature of a connection system such as that shown in FIGS. 14 and 15.
Figure 16B:
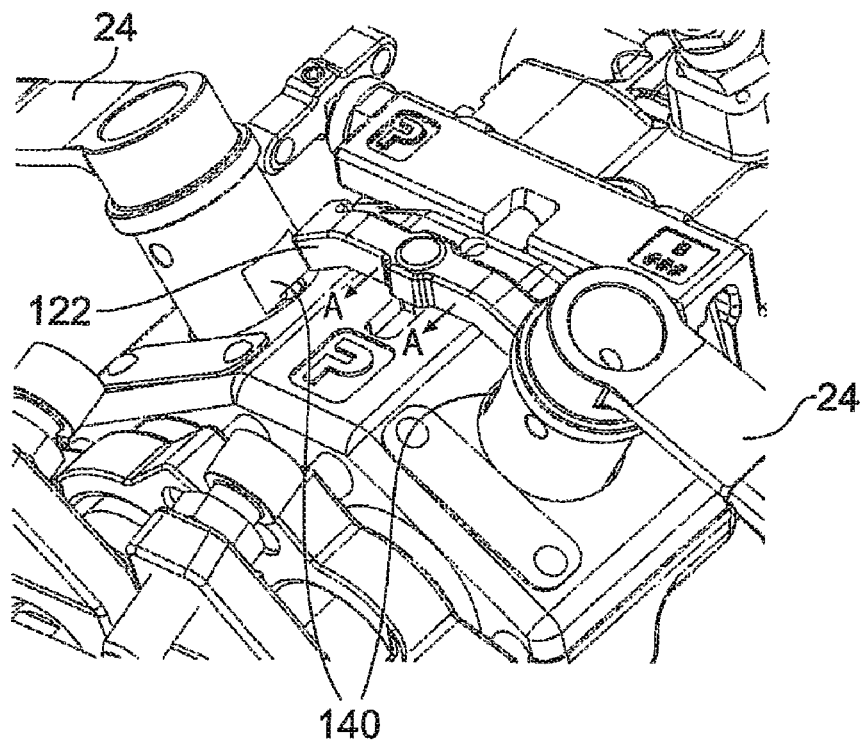

FIGS. 16A and 16B illustrate the movement of the levers 24 and handle 122 for disconnecting the connection module 20 and the intermediate module 34. In FIG. 16A, the levers 24 are in their "open" position to allow fluid to flow through the connection assembly. The grooves 140 are shown not to be aligned with the handle 122 while the levers 24 are in this position. By rotating the levers 24 in the directions shown by the arrows labelled B in FIG. 16A, valves in the manifold section 30 are closed to block fluid flow through the assembly. As shown in FIG. 16B, when the levers 24 are in their "closed" position, the grooves 24 align to allow movement of the handle 122 in the direction indicated in FIG. 16B by the arrows labelled A. As described above, movement of the handle 122 in this manner pulls back the slideable member 120, allowing access for inserting a tool to withdraw the locking member 118.

In other examples of a connection system, the locking member 118 can be actuated by means other than a biasing element such as the helical spring 126. Accordingly, the locking member could be actuated by electrical or other means.

In the example shown in FIG. 14, the second jaw 114 is provided with an indicator portion 132. An end 134 of the indicated portion can be brightly coloured so that it is clearly visible when it protrudes from the opening 104 of the second jaw 114. The indicator portion 132 is slideably mounted substantially within the opening 104. In this example, the indicator portion 132 is biased by means of a biasing element such as a helical spring 136 to remain within the opening 104. When the locking member 118 is slideably received in the opening 104, however, it abuts the indicator portion 132 and urges the indicator portion outward from the opening 104. When the indicator portion emerges from the opening 104, this can be taken as an indication that the locking member 118 is correctly received within the opening 104, thereby providing an indication that a good connection has been achieved.

Figure 17:
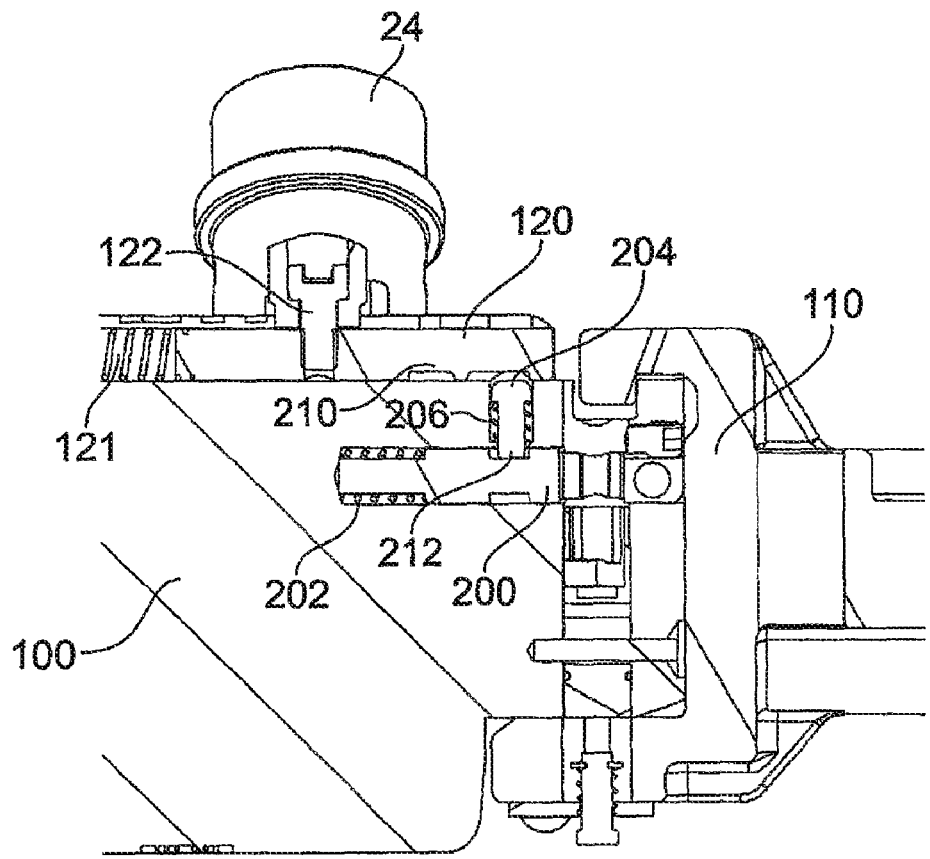
FIGS. 17 and 18 show a modular connection system in accordance with an embodiment of the invention.
Figure 18:
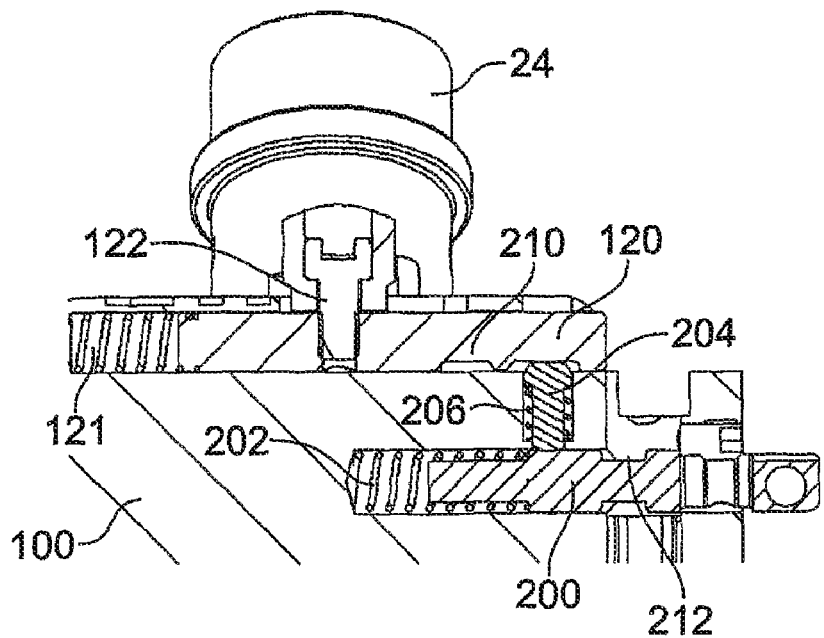

FIGS. 17 and 18 illustrate a further example of a safety feature which can be incorporated in to a connector in accordance with an embodiment of this invention. In this example, a safety mechanism is provided which is similar in some aspects to the safety mechanism described above in relation to FIGS. 14 to 16. In addition to preventing inadvertent removal of, for example, a intermediate module 34 while the levers 24 of a manifold section 30 are in their open position, the mechanism shown in FIGS. 17 and 18 also prevents inadvertent opening of the levers 24 while, for example, an intermediate module 34 is not connected to the manifold section 30. This prevents fluid from being inadvertently released until the manifold section is replaced. While the example of connection between an intermediate module 34 and a manifold section 30 is used here, it will be appreciated that a safety mechanism of this kind could be applied for connections between other kinds of module in a modular connection assembly.

Referring now to FIGS. 17 and 18, the safety mechanism includes a slideable member 120 biased by a biasing element such as a helical spring 121, a handle 122 and levers 24 which include alignment grooves as described above in relation to FIGS. 14 to 16. Additionally, the mechanism includes a first pin 200 and a second pin 204. The first pin 200 is located in a slot in the connector 100 and is biased outwardly from the slot by a biasing element 202. The second pin 204 is biased against an upper edge of the first pin 200 by a biasing element 206. In this example, the slideable member 120 includes two grooves shown at 210, with which the second pin 204 can engage to prevent sliding movement of the slideable member 120 (this is illustrated in FIG. 18). The first pin 200 also includes a groove 212 with which the second pin 204 can engage (this is illustrated in FIG. 17).

FIG. 17 shows the connectors 100 and 110 in their connected position. In the position, the connector 110 forces the first pin 200 back into the connector 100, against the bias of the biasing element 202. In this position, the groove 212 of the first pin 200 aligns with the second pin 204, and the second pin 204 is pressed into the groove 212 under the bias of the biasing element 206. While the second pin 204 is held in the groove 212 of the first pin 200, the second pin does not occupy a groove 210 of the slideable member 120, and the slideable member 120 is free to move, as long as the grooves of the levers 24 are correctly aligned with the handle 122 as described above.

When the connector 110 is disconnected from the connector 100, for example as described in relation to FIGS. 14 to 16, the first pin 200 is pushed outward from the connector 100, to a position shown in FIG. 18. It should be noted that when disconnection occurs, the slideable member will generally be in a withdrawn position having just allowed access to the aperture 124 for insertion of a tool to withdraw the locking member 118. As the first pin 200 is pushed out from the connector 100, the second pin is pushed out of the groove 212 against the bias of the biasing element 206. This pushes the second pin 204 into one of the grooves 210 of the slideable member 120. While the second pin 204 occupies the groove 210 as illustrated in FIG. 18, the slideable member and therefore the handle 122 cannot move back and forth. This in turn prevents the levers 24 from being moved to their open position, since this movement is blocked by the handle 122, which occupies the grooves 140 of the levers 24 (see FIGS. 16A and 16B). Thus, while the connector 100 and connector 110 are disconnected, the levers 24 cannot be moved and the valves controlled by the levers 24 cannot be opened.

When the connector 110 is reconnected to the connector 100, the first pin is forced back into the connector 100, realigning the groove 212 with the second pin 204. The second pin re-enters the groove 212, thereby allowing the slideable member and handle 122 to be moved. Once the handle 122 is removed from the grooves 140, the levers 24 can be operated to open the valves which they control.

Thus there has been described a safety feature which prevents inadvertent operation of the levers, while the connectors 100 and 110 are disconnected. Although particular embodiments of the invention have been described, it will be appreciated that many modifications/additions and/or substitutions may be made within the scope of the claimed invention.

What is claimed is:

1. An assembly for connection to a structure having a port, the assembly comprising:
    a first tapping connector extending along a central axis from a first end portion attachable in fluid communication to the port of the structure to a second end portion;
    a primary module attachable in fluid communication to the second end portion of the first tapping connector, the primary module having a collar receivable over the first tapping connector second end portion for supporting the primary module on the structure, the collar being attachable to the first tapping connector, and the primary module having a connector portion;
    a secondary module mountable on the connector portion of the primary module in fluid communication therewith; and
    a positioner supported within the collar for fastening the collar to the first tapping connector,
    whereby the first tapping connector second end portion forms at least one joint with the primary module allowing for the primary module while attached to the second end of the first tapping connector to be moved in one or more directions of either laterally or rotationally relative to the central axis of the first tapping connector to thereby dispose the primary module in a select orientation, and
    whereby the positioner is tightenable to the first tapping connector second end portion to apply a compressive force thereto retaining the primary module in the select orientation.

2. The assembly of claim 1 further comprising a second tapping connector extending along a central axis from a first end portion attachable in fluid communication to the port of the structure to a second end portion, the primary module being attachable in fluid communication to the second end portion of each of the first tapping connector and the second tapping connector, and the second end portion of each of the first tapping connector and the second tapping connector forming at least one joint with the primary module allowing for the primary module while attached to the second end portion of each of the first tapping connector and the second tapping connector to be moved in one or more directions of either laterally or rotationally relative to the axis of each of the first tapping connector and the second tapping connector.

3. The assembly of claim 1 wherein the first tapping connector second end portion has a slot and wherein the positioner is a ring which is receivable in the slot.

4. The assembly of claim 1 wherein the first tapping connector second end portion forms a ball joint with the primary module, the primary module being rotatable on the ball joint.

5. The assembly of claim 1 wherein the first tapping connector second end portion includes an elongate portion and a swivel joint component disposed intermediate the elongate portion and the primary module, the swivel joint component being jointed to the elongate end portion with a first ball joint and to the primary module with a second ball joint.

* * * * *